United States Patent [19]

Evans

[11] 4,342,208
[45] * Aug. 3, 1982

[54] LOCKING GAS CAP WITH TORQUE OVERRIDE FEATURE

[75] Inventor: John H. Evans, Connersville, Ind.

[73] Assignee: Stant Inc., Connersville, Ind.

[*] Notice: The portion of the term of this patent subsequent to Jan. 4, 1994, has been disclaimed.

[21] Appl. No.: 876,030

[22] Filed: Feb. 8, 1978

Related U.S. Application Data

[60] Division of Ser. No. 735,252, Oct. 29, 1976, Pat. No. 4,107,961, which is a continuation-in-part of Ser. No. 611,219, Sep. 8, 1975, Pat. No. 4,000,633.

[51] Int. Cl.³ .................. B65D 51/16; B65D 55/14
[52] U.S. Cl. .................................. 70/165; 220/210
[58] Field of Search .................. 70/165–171, 70/158, 218, 222, 223, 231; 220/203, 210, 288, 303

[56] References Cited

U.S. PATENT DOCUMENTS

| | | | |
|---|---|---|---|
| 2,467,087 | 4/1949 | Konchan | 70/165 |
| 3,820,680 | 6/1974 | Friend | 220/203 |
| 3,907,155 | 9/1975 | Smith et al. | 220/210 |
| 3,986,634 | 10/1976 | Smith et al. | 220/288 |
| 3,998,078 | 12/1976 | Detwiler | 220/210 X |
| 4,000,632 | 1/1977 | Summan | 70/165 |
| 4,000,633 | 1/1977 | Evans | 70/165 |

FOREIGN PATENT DOCUMENTS 2014130 12/1971 Fed. Rep. of Germany.

Primary Examiner—William E. Lyddane
Attorney, Agent, or Firm—Jenkins, Coffey, Hyland, Badger & Conard

[57] ABSTRACT

A locking gas cap for a threaded filler neck having a sealing lip extending peripherally about its axis, the cap comprising a closure member threaded to engage and close the filler neck, a gasket on the closure member for engaging and sealing against the lip, an outer shell providing a hand grip secured to the closure member for rotation thereon, a key-operated lock and at least one lock-actuable bolt connected to the shell for rotation therewith. A race is disposed for rotation in the shell, and a driving connection is provided between the race and the closure member which is torque limited in the direction which advances the closure member on the filler neck and positive in the cap removal direction. A spring is provided for yieldably urging the bolt into engagement with the race. The spring cooperates with a plurality of engaging pockets in the race to provide a positive driving connection between the shell and race in the direction which advances the closure onto the filler neck. When the lock is not in a cap removal position and the shell is rotated in the cap removal direction, the bolt cams out of the pockets against the urging of the spring, allowing the shell to turn with respect to the race to prevent cap removal. When the lock is in its cap removal position, it blocks motion of the bolt out of the pockets to lock the shell to the race.

5 Claims, 10 Drawing Figures

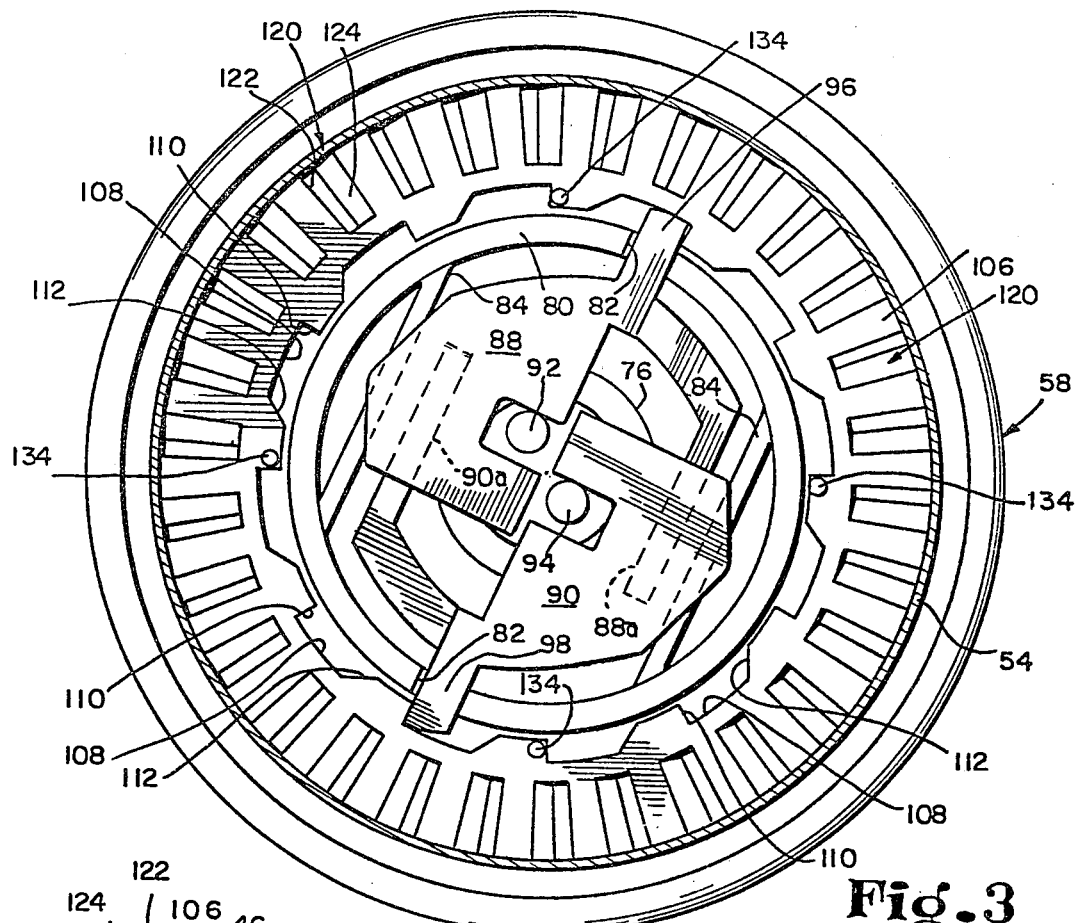
Fig. 3
Fig. 5
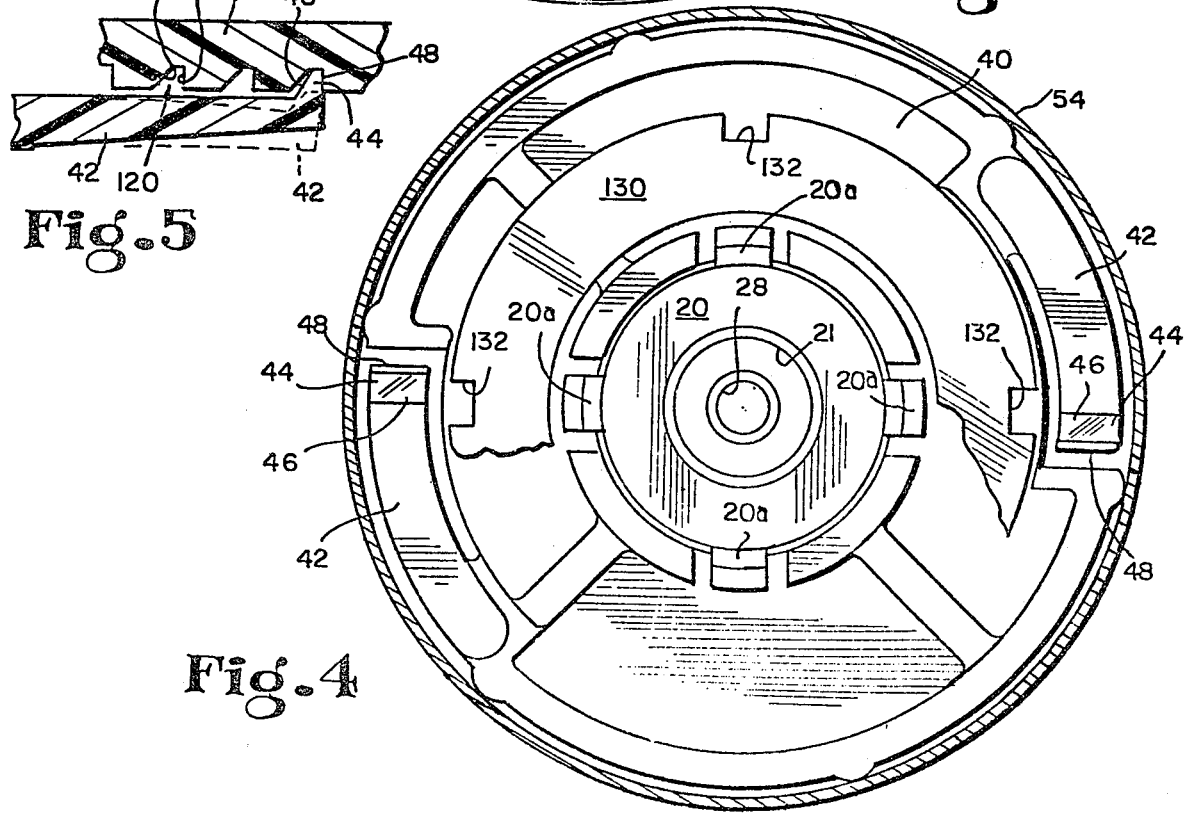
Fig. 4

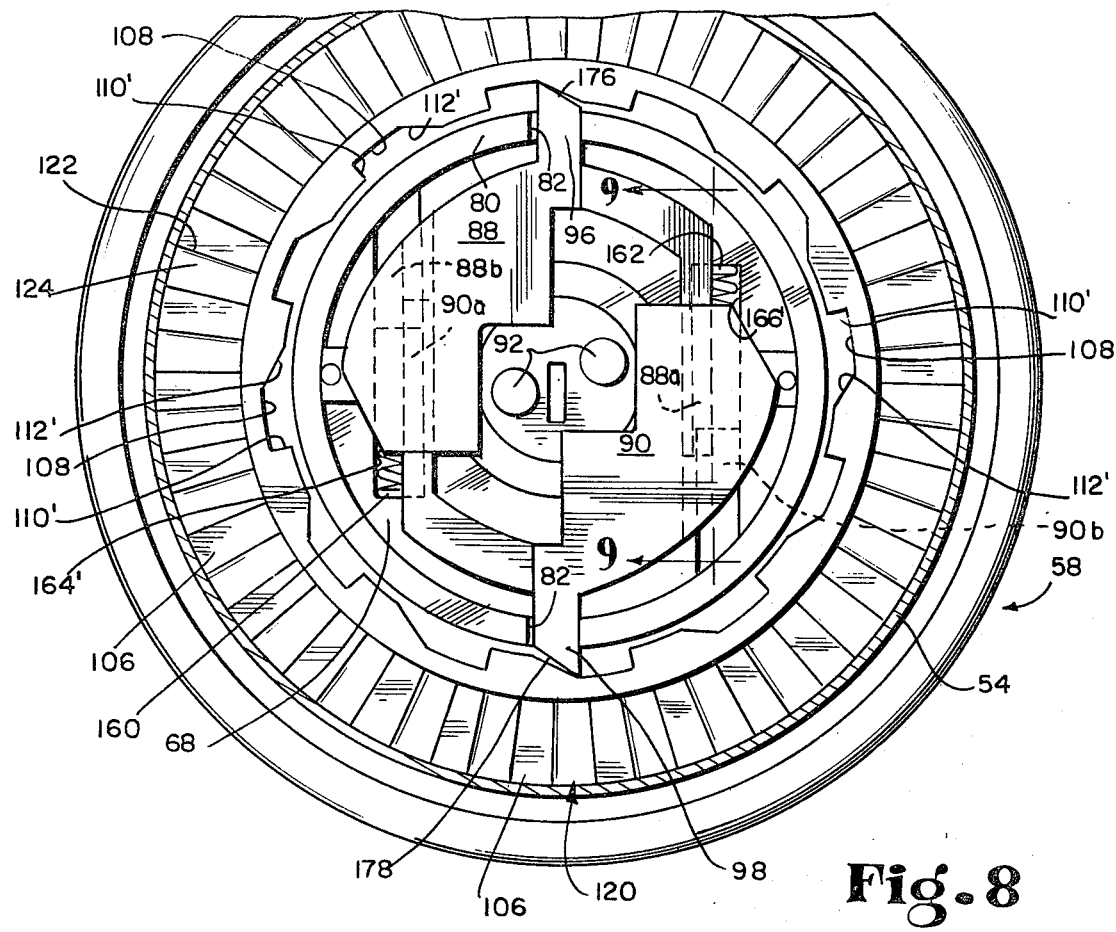
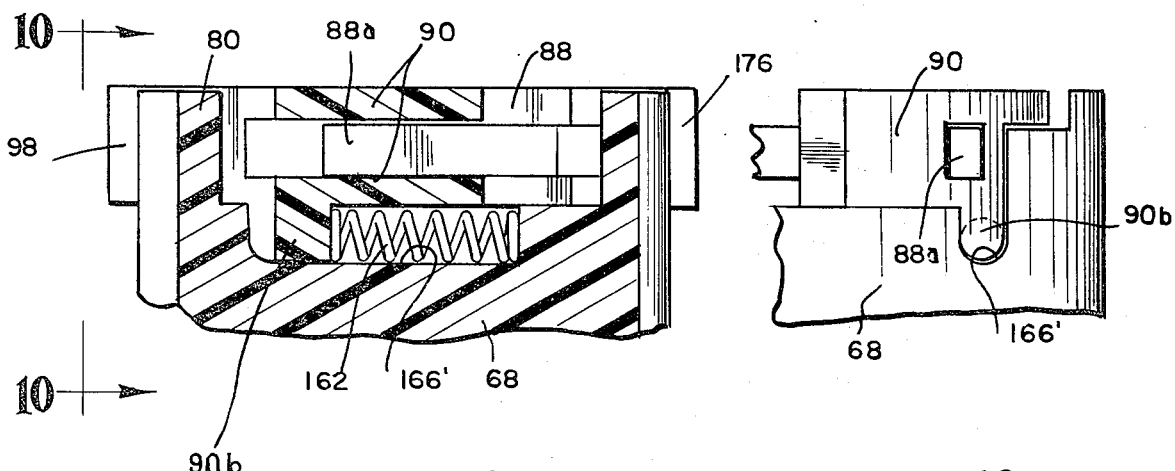

LOCKING GAS CAP WITH TORQUE OVERRIDE FEATURE

This application is a division of application Ser. No. 735,252, filed Oct. 29, 1976, now U.S. Pat. No. 4,107,961 and assigned to the same assignee as the present invention. Application Ser. No. 735,252 is a continuation-in-Part of Application Ser. No. 611,219, filed Sept. 8, 1975, now U.S. Pat. No. 4,000,633

The present invention relates to caps for vehicle fuel tanks and more particularly to the provision of a threaded cap for a threaded filler neck, which cap is provided with a key lock to protect the contents of the fuel tank as well as a torque-override feature to protect the sealing gasket of the cap and to prevent the cap from being threaded too tightly onto the filler neck. Locking gas caps are, of course, very old in the art. Most locking gas caps, however, are designed to work with filler necks which have peripherally extending cam-lock surfaces rather than filler necks which are threaded. Such conventional locking gas caps include a cylinder lock mechanism for moving a locking member radially into engagement with the cam lock surface to prevent unauthorized removal of the cap.

The prior art also includes showings of locking caps, not necessarily fuel caps, comprising threaded closure members and outer shells with key-lock means for selectively providing a driving connection between the outer shells and the closure members. In such devices, until the key is actuated, the outer shell will simply rotate on the closure member and not disengage the closure member from its closing position. See, for instance, U.S. Pat. Nos. 2,101,758, 2,070,692 and 2,467,087. The present invention involves a considerable improvement over such threaded locking caps of the prior art. First of all, the present invention incorporates a torque-override feature which prevents the closure member of the cap from being twisted too tightly on the filler neck, thereby damaging the threads or the gasket which provides a seal between the filler neck and the closure member. The torque-override feature also prevents tightening the cap so tight it is difficult to remove.

While the prior art does have showings of gas caps with torque-override features, for instance as shown in the Dawson Friend U.S. Pat. No. 3,820,680, the present invention constitutes a significant improvement because of the manner in which the torque-override feature is incorporated with the locking feature. Particularly, in the cap of the present invention, a race is provided in the outer shell for rotation about the coinciding axes of the outer shell and closure member, this race serving as an important part of the locking feature as well as an important part of the torque-override feature.

According to the present invention, a locking gas cap includes a race disposed for rotation in an outer shell which provides the hand grip for the cap. Means are provided for drivingly connecting the race and the closure member for rotation together about the coinciding axes of the cap and filler neck, the connecting means being torque-limited in the direction which advances the closure member on the filler neck and positive in the opposite direction. The outer shell carries locking means including a lock-actuable bolt. The cap further includes means for yieldably urging the bolt into engagement with the race, the race including engaging means cooperating with the bolt drivingly to connect the shell to the race when the shell is turned in a direction to advance the cap on the filler neck and to provide slipping or ratcheting rotation of the shell with respect to the race when the shell is turned in a cap removal direction and the lock is not in a cap removal position. When the lock is in the cap removal position, the bolt is held against movement out of engagement with the race for removal of the cap from the filler neck.

The invention may best be understood by referring to the following description and accompanying drawings which illustrate the invention. In the drawings:

FIG. 3 is a view similar to FIG. 2 only showing the locking members in their radially outer positions engaging the race;

FIG. 4 is a sectional view taken along the line 4—4 in FIG. 1;

FIG. 5 is an enlarged fragmentary sectional view taken from FIG. 1 generally along the line 5—5;

FIG. 8 is a sectional view of another cap constructed in accordance with the present invention;

FIG. 9 is a fragmentary sectional view of the cap of FIG. 8 taken generally along section line 9—9 thereof; and FIG. 10 is a fragmentary sectional view of the cap of FIGS. 8–9 taken generally along section line 10—10 of FIG. 9.

Figure 1:
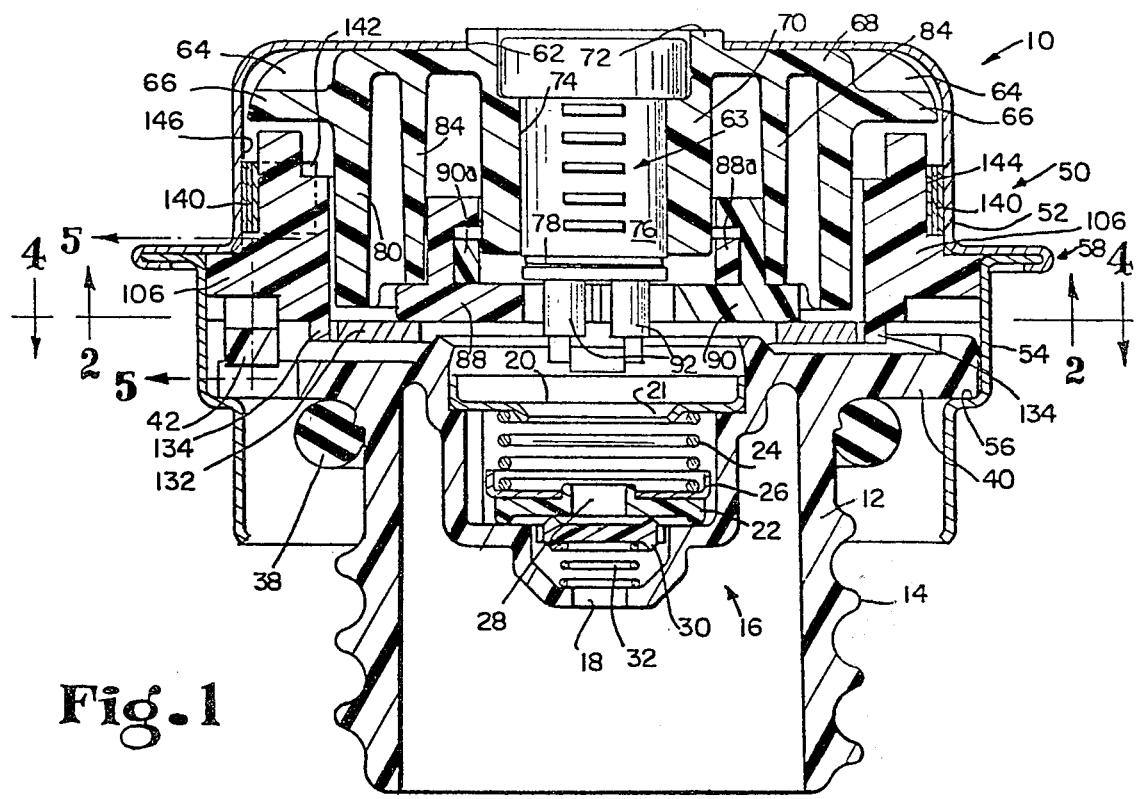
FIG. 1 is a sectional view of a cap constructed in accordance with the present invention.
Figure 2:
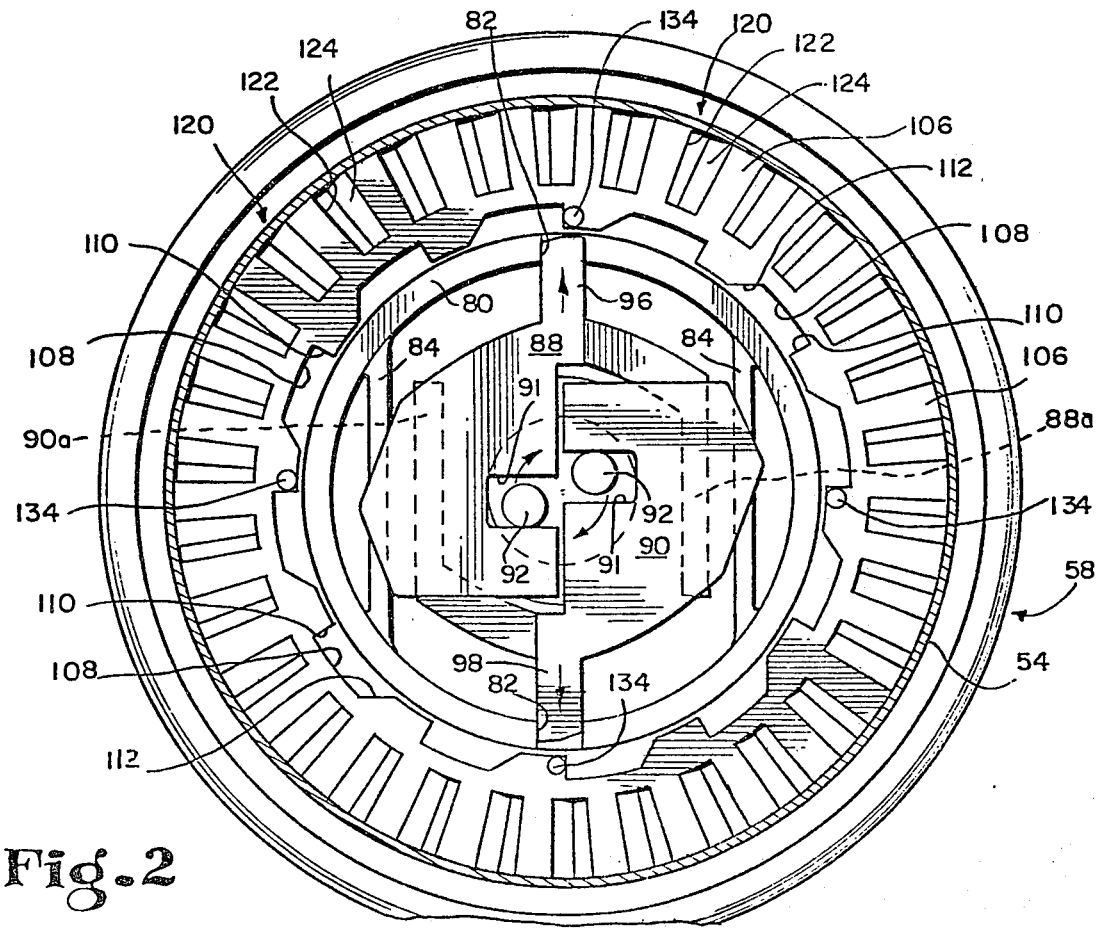
FIG. 2 is a sectional view taken from FIG. 1 generally along the line 2—2.

Referring to the drawings, and particularly to FIGS. 1-5, it will be seen that the cap 10 comprises a molded plastic closure member 12 having an axially inwardly extending shank threaded as indicated at 14 and providing a pressure-vacuum valve assembly 16 for controlling venting of the fuel tank through an opening 18, the valve assembly including a valve cover plate 20 having an opening 21 centrally located therein and being secured in place by staked-over portions 20a (FIG. 4). The valve assembly further includes a pressure valve 22 urged to its closing position by means of a spring 24 and spring plate 26, the pressure valve having a central opening 28 therein normally closed by a vacuum valve member 30 urged to its closing position by a spring 32. Such a valve assembly 16 is now well known in the art and is merely illustrative in this disclosure. In order to assure that venting occurs through the valve assembly 16, the closure member 12 carries a sealing ring 38 about its shank portion and against its upper, peripherally and radially outwardly extending flange 40. The illustrative flange 40 is provided with a pair of diametrically opposed, peripherally extending drive fingers or pawls 42 having distal end portions 44. The fingers 42 are integrally formed on the closure member resiliently to be urged upwardly. Each finger 42 distal end portion 44 has a best viewed in FIG. 5 an inclined wall 46 and an abrupt wall 48.

The cap 10 also comprises an outer shell 50 secured to the closure member 12 for rotation on the closure member about the axis of the cap 10. The illustrative outer shell 50 is formed by an upper shell member 52 and lower shell member 54 which provides an axially outwardly facing, radially inwardly extending flange surface 56 for engaging the bottom side of the flange 40, the parts 52, 54 being joined together as indicated at 58. The outer shell 50 is provided with a concentric opening 62 to accommodate the cylinder lock assembly indicated generally at 63 and four peripherally spaced apart, radially outer pockets 64 for receiving, respectively, radially outwardly extending tabs 66 formed on the lock assembly 63 housing 68, only two such pockets 64 and tabs 66 being shown. The engagement of the tabs 66 in the pocket 64 secures the lock assembly 63 in the outer shell 50 for rotation therwith relative to the closure member 12. The illustrative housing 68 is primarily a cylindrically formed housing providing a concentric, inner cylindrical shell 70 having an upper portion 72 received in the opening 62 and defining an internal cylindrical opening 74 for receiving a conventional cylinder 76 which is secured against axial movement upwardly out of the opening 74 by a locking ring 78.

The housing 68 is also illustratively formed to have an outer annular depending wall 80 formed to provide, at its distal (lower) edge, radially outwardly extending slots 82 which serve as guide means for locking members to be described hereinafter. The housing is also illustratively formed with transversely extending guide walls 84 for such locking members, these walls being best seen in FIGS. 2 and 3.

The illustrative locking members 88, 90 are formed to have interlocking portions 88a, 90a and slots 91 for receiving the axially extending drive pins 92 provided by the cylinder 76. When the cylinder is rotated clockwise as viewed in FIG. 2, the pins 92 engage the slots 91 to drive the locking members 88, 90 radially outwardly or to their radially outer positions shown in FIG. 3, each locking member having a locking bolt or locking portion 96, 98 guided for movement radially through the slots 82 in the wall 80.

The cap 10 comprises also a race 106 which is illustratively an annular member disposed in the outer shell 50 for rotation relative thereto about the cap axis. The race 106 provides a plurality of peripherally spaced apart, radially inwardly facing notches 108 having peripherally spaced apart walls 110, 112, the wall 110 being an abrupt wall and the wall 112 being a chordally and axially extending inclined wall as illustrated. The locking portions or bolts 96, 98 engage into these notches 108 as best seen in FIG. 3. With the locking members 88, 90 in the positions shown in FIG. 3, rotation of the outer shell 50 and, consequently, the locking members 88, 90 will rotate the race 106 with the outer shell. The inclined walls 112 aid in directing bolts 96, 98 into notches 108.

The race 106 is also formed to provide a plurality of peripherally spaced apart, downwardly facing pockets 120 having peripherally spaced apart, radially extending faces or walls 122, 124, the wall 122 being abrupt and the wall 124 being inclined as best seen in FIG. 5. The distal end portions 44 of the fingers 42 engage into these pockets 120. Looking at FIG. 5, when the race 106 is moved to the right which corresponds to clockwise movement of the cap 10, looking down at the cap on the filler neck of the vehicle, the inclined wall 124 will act against the incline 46 of the finger 42 to move the finger downwardly out of engagement with the race 106. This provides the torque-override feature of the cap 10 which prevents the cap from being tightened so that the threads 14 or the sealing ring 38 will not be damaged. The pockets 120, of course, cooperate with the fingers 42 much in the same manner as a ratchet and pawl arrangement. When it is desired to remove the cap, assuming that the race 106 is drivingly connected to the outer shell 50 by actuation of the locking members 88, 90, the abrupt wall 122 of a pocket 120 will engage the abrupt wall 48 of a drive finger 42 to move the closure member counterclockwise threadedly to disengage the filler neck. The driving connection, therefore, between the race 106 and closure member 12 is torque-limited in the direction which advances the threaded engagement of the cap on the filler neck and positive in the opposite direction to permit removal of the cap when the cylinder lock is actuated drivingly to connect the outer shell 50 to the race 106.

Often, an automobile owner will desire to use his key to project the locking members 88, 90 radially outwardly so that the cap 10 can be removed from the filler neck. Then, while the cap 10 is off the filler neck and, for instance, the tank is being filled, the key may be removed from the cylinder 76 leaving the locking members 88, 90 in a retracted position or radially inner position. It is necessary conventionally to move the drive pins 92, 94 back to their starting position in order to remove the key from the cylinder 76. In such a case, the outer shell 50 is drivingly connected to the race 106 by frictional driving means. The illustrative frictional driving means includes a spring steel band 140 having its proximal end 142 bent radially inwardly and, therefore, connected to the race 106 and its distal end free. The spring 140 is wrapped about an outer diameter 144 of the race 106 radially to expand outwardly to engage a concentric internal wall 146 of the outer shell 50. The spring band 140 extends from this proximal end 142 counterclockwise about the wall 144. Thus, when the outer shell 50 is rotated in the clockwise direction, the spring band tends to expand to engage the shell wall 146 to provide a frictional driving connection which is sufficient to move the race 106 to drive the closure member 12 onto the filler neck. In fact, the driving torque of the spring band 140 is greater than the torque at which the fingers 42 will be cammed out of engagement with the pockets 120. Additionally, inclined walls 112 of notches 108 serve to cam bolts 96, 98 radially inwardly out of notches 108 when the outer shell 50 is rotated for advancing closure member 14 into the filler neck to close the fuel tank. This protects the lock mechanism and leaves the driving to the spring band 140.

Figure 6:
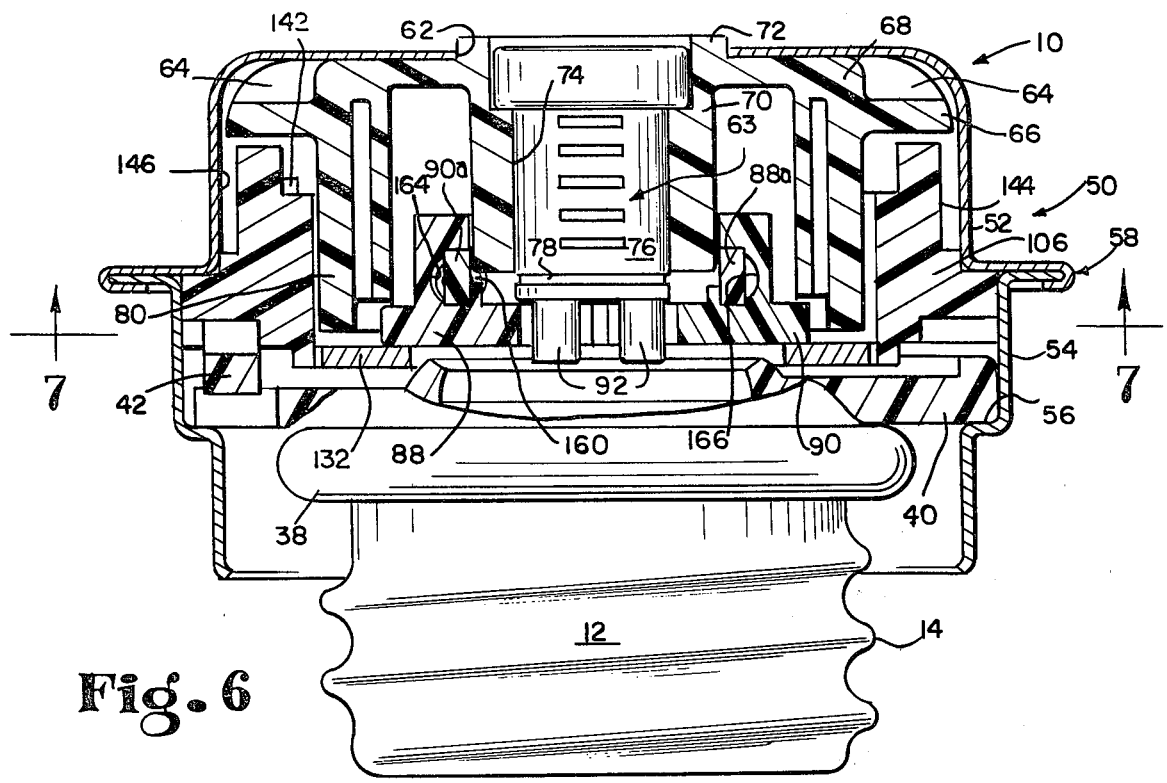
FIG. 6 is a partly sectional side elevational view of another cap constructed in accordance with the present invention.
Figure 7:
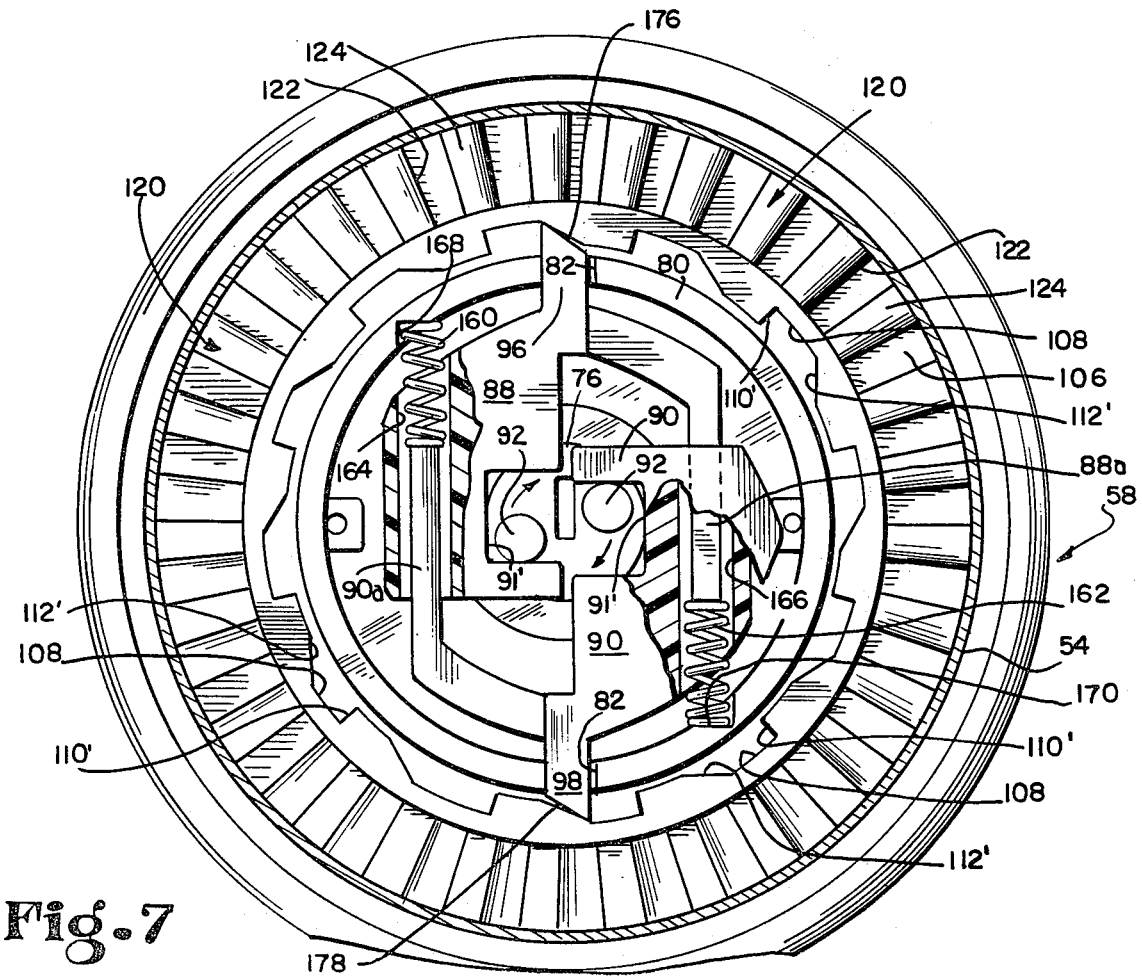
FIG. 7 is a sectional view of the cap of FIG. 6 taken generally along section line 7—7 thereof.

In a second embodiment of the gas cap, illustrated in FIGS. 6-7, those elements numbered identically with the elements of FIGS. 1-5 perform the same or similar functions. In the second embodiment, race 106 provides a plurality of peripherally spaced apart, radially inwardly facing notches or pockets 108, as in the preceding embodiment. However, the peripherally spaced apart walls 110', 112' in the race 106 of the second embodiment are reversed. That is, the abrupt, radially and axially extending wall 110' in the second embodiment is on the opposite side of each pocket 108 from wall 110 in the first embodiment of FIGS. 1 and 5. Thus, wall 112' of each pocket 108 is on the opposite side of the pocket from wall 112 of the first embodiment. As before, each wall 112' extends generally along a chord of the circle defining the radially inwardly facing surfaces of pockets 108.

The locking bolts 96, 98 are yieldably urged into engagement with pockets 108 by a pair of helical springs 160, 162, respectively. Helical springs 160, 162 are disposed in cavities 164, 166, respectively, in locking members 88, 90. Springs 160, 162 are positioned against the inner side of depending wall 80 of housing 68 in notches 168, 170, respectively, provided therefor. Spring 160 urges against interlocking portion 90a of member 90 to urge the bolt 98 of member 90 outwardly into engagement with one of pockets 108. Spring 162 urges against interlocking portion 88a to urge bolt 96 outwardly into engagement with one of pockets 108.

The slots 91' of locking members 88, 90 in the second embodiment are somewhat larger than the slots 91 of the first embodiment of FIGS. 1-5. Rotation of the cylinder 76 of the embodiment of FIGS. 6-7 in the clockwise direction, as indicated by the arrows in FIG. 7, positions the drive pin 92 to lock bolts 96, 98 in their radially extended cap removal positions. However, due to the size of slots 91', rotation of cylinder 76 and movement of drive pins 92 in the counterclockwise direction (to the positions illustrated in FIG. 7) does not cause bolts 96, 98 to be retracted from engagement with pockets 108. The ends 176, 178 of bolts 96, 98, respectively, are shaped to cooperate with walls 110' to provide a driving connection between outer shell 50 and race 106 in the direction (clockwise looking down on the filler neck) to advance closure 12 on the filler neck. Springs 160, 162 urge ends 176, 178 outwardly into engagement with walls 110'. Walls 112' cooperate with ends 176, 178 to cam bolts 96, 98 and their respective locking member 88, 90 radially inwardly against the urging of springs 160, 162 to allow outer shell 50 to ratchet with respect to race 106 when shell 50 is turned in such direction (counterclockwise looking down on the filler neck) to remove cap 10 from the filler neck. Radially inward projection of locking members 88, 90 when drive pins 92 are not in the cap removal position is allowed by the ample size of slots 91'.

In a third embodiment of the invention, illustrated in FIGS. 8-10, those elements numbered identically with the elements in the embodiments of FIGS. 1-7 perform the same or similar functions. In the third embodiment, as in the second embodiment, helical springs 160, 162 urge locking members 88, 90 and their respective bolts 96, 98 radially outwardly into pockets 108. In the third embodiment, springs 160, 162 are housed in cavities 164', 166' in lock assembly housing 68 axially outwardly or upwardly from locking members 88, 90. Members 88, 90 are provided with axially extending tabs 88b, 90b, respectively. The springs 160, 162 lie in their respective cavities 164', 166' and urge against tabs 88b, 90b. Springs 160, 162 thereby urge their respective locking members 88, 90 and bolts 96, 98 outwardly into engagement with pockets 108 on race 106. As with the second embodiment, the slots 91' in the locking members 88, 90 of the third embodiment are sufficiently large that drive pins 92 can be moved from their cap removal positions to their locking positions, illustrated in FIG. 8, without disturbing the projection of bolts 96, 98 into respective ones of pockets 108. The locations of drive pins 92 in their locking positions allow locking bolts 96, 98 to move radially inwardly against the urging of springs 160, 162. The cooperating surfaces 176, 178 of the bolts and surfaces 112' of pockets 108 provide this radial movement to ratchet shell 50 on race 106. When the drive pins 92 are in their cap removal positions against locking members 88, 90, bolts 96, 98 are held radially outwardly against surfaces 112' to lock shell 50 to race 106 for cap removal (motion in the clockwise direction in FIG. 8).

What is claimed is:

1. A locking gas cap for a threaded filler neck having an axis and sealing lip extending peripherally about said axis, said cap comprising a closure member threaded to engage and close said filler neck, gasket means on said closure member for engaging and sealing against said lip, an outer shell providing a hand grip secured to said closure member for rotation thereon about said axis, a key-operated lock and at least one locking member moved by said lock, said lock and locking member being connected to said shell for rotation therewith, in which the improvement comprises a race disposed for rotation between, and with respect to said shell and closure member, said locking member being movable into and out of engagement with said race, said shell and closure member providing adjacent axially facing surfaces between which said race is axially stationarily positioned, and means for drivingly connecting said race and said closure member for rotation together about said axis, said connecting means being torque-limited in the direction which advances said closure member on said filler neck to protect said gasket means against overtightening and positive in the opposite direction to permit removal of said cap from said filler neck.

2. The improvement of claim 1 wherein said means for drivingly connecting the race and closure member includes at least one drive finger provided by said closure member, said race being formed to provide a plurality of peripherally spaced apart pockets, said finger having a distal end portion engageable with said pockets, said finger being resiliently disposed yieldably to urge said distal end portion into engagement with said pockets, each of said pockets having an abrupt leading wall for engaging and driving said finger end portion when said shell is turned in said opposite direction and an inclined following wall for engaging and driving said finger end portion when said shell is turned in the first said direction which advances said cap on said filler neck, said finger end portion being resiliently urged out of one of said peripherally spaced apart pockets at the limiting torque.

3. The improvement of claim 1 wherein said locking member is movable into and out of engagement with said race selectively to provide a driving connection between said shell and said race.

4. The improvement of claim 1 wherein said locking member is movable into and out of engagement with said race, said race being provided with a plurality of radially inwardly opening pockets, each of said pockets having an abrupt leading wall for engaging and driving said locking member when said shell is turned in the first said direction which advances said cap on said filler neck, each said pocket further including an inclined following wall for engaging and driving said locking member when said shell is turned in said opposite direction, said locking member including an inclined wall for engaging the inclined following wall, and an abrupt leading wall for engaging said abrupt leading wall of said pocket.

5. The improvement of claim 4 wherein said locking member is spring-urged into engagement with said radially inwardly opening pockets.

* * * * *